US012586547B2

(12) United States Patent
Jing et al.

(10) Patent No.: US 12,586,547 B2
(45) Date of Patent: Mar. 24, 2026

(54) COMPENSATION DEVICE AND METHOD FOR DISPLAY APPARATUS, DISPLAY APPARATUS, AND COMPUTER STORAGE MEDIUM

(71) Applicants:Chengdu BOE Optoelectronics Technology Co., Ltd., Chengdu (CN); BOE Technology Group Co., Ltd., Beijing (CN)

(72) Inventors: Tan Jing, Beijing (CN); Yini Zuo, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 96 days.

(21) Appl. No.: 18/287,655

(22) PCT Filed: Jan. 16, 2023

(86) PCT No.: PCT/CN2023/072372
§ 371 (c)(1),
(2) Date: Oct. 20, 2023

(87) PCT Pub. No.: WO2024/152153
PCT Pub. Date: Jul. 25, 2024

(65) Prior Publication Data
US 2025/0087182 A1 Mar. 13, 2025

(51) Int. Cl.
*G09G 5/10* (2006.01)
*G06T 7/00* (2017.01)
(Continued)

(52) U.S. Cl.
CPC ............ *G09G 5/10* (2013.01); *G06T 7/0002* (2013.01); *G06T 7/73* (2017.01); *G09G 5/02* (2013.01);
(Continued)

(58) Field of Classification Search
CPC .... G09G 5/10; G09G 5/02; G09G 2320/0233; G09G 2320/0242; G09G 2320/0686;
(Continued)

(56) References Cited

U.S. PATENT DOCUMENTS

| | | | |
|---|---|---|---|
| 2014/0333681 A1 | 11/2014 | Oh | |
| 2017/0293818 A1* | 10/2017 | Zagaynov | ................. G06T 5/40 |
| 2020/0036971 A1 | 1/2020 | Sim et al. | |
| 2023/0215403 A1* | 7/2023 | Zhang | ...................... G09G 3/36 |
| | | | 345/690 |

(Continued)

FOREIGN PATENT DOCUMENTS

| | | |
|---|---|---|
| CN | 106991981 A | 7/2017 |
| CN | 108630148 A | 10/2018 |

(Continued)

*Primary Examiner* — Sahlu Okebato
(74) *Attorney, Agent, or Firm* — XSENSUS LLP

(57) ABSTRACT

Provided is a compensation device for a display apparatus, including an image-acquiring assembly and a control assembly, wherein the image-acquiring assembly is configured to acquire a first image in a case that the display apparatus displays a picture of a first color; the control assembly is configured to determine a reference region in the first image based on a position of a region to be compensated in the first image in a first direction, wherein the reference region has a same position as the region to be compensated in the first direction, the reference region being greater than the region to be compensated; and the control assembly is configured to determine compensation data of the region to be compensated based on average brightness of the reference region and average brightness of the region to be compensated.

10 Claims, 18 Drawing Sheets

(51) Int. Cl.
    *G06T 7/73*         (2017.01)
    *G09G 5/02*        (2006.01)

(52) U.S. Cl.
    CPC .............. *G06T 2207/10024* (2013.01); *G06T*
          *2207/30168* (2013.01); *G09G 2320/0233*
      (2013.01); *G09G 2320/0242* (2013.01); *G09G*
                          *2320/0686* (2013.01)

(58) Field of Classification Search
    CPC .................... G06T 7/0002; G06T 7/73; G06T
                  2207/10024; G06T 2207/30168
    See application file for complete search history.

(56)                 References Cited

U.S. PATENT DOCUMENTS

| | | | |
|---|---|---|---|
| 2024/0114116 A1* | 4/2024 | Fung .................... | H04N 9/3194 |
| 2024/0135893 A1* | 4/2024 | Hong .................. | G09G 3/3607 |

FOREIGN PATENT DOCUMENTS

| | | |
|---|---|---|
| CN | 110148375 A | 8/2019 |
| CN | 111223434 A | 6/2020 |
| CN | 111710277 A | 9/2020 |
| CN | 112292863 A | 1/2021 |
| CN | 112509514 A | 3/2021 |
| CN | 113270062 A | 8/2021 |
| CN | 113421515 A | 9/2021 |
| CN | 114038418 A | 2/2022 |
| CN | 114141213 A | 3/2022 |
| CN | 114333669 A | 4/2022 |
| CN | 115100985 A | 9/2022 |
| CN | 115311977 A | 11/2022 |

* cited by examiner

61

61

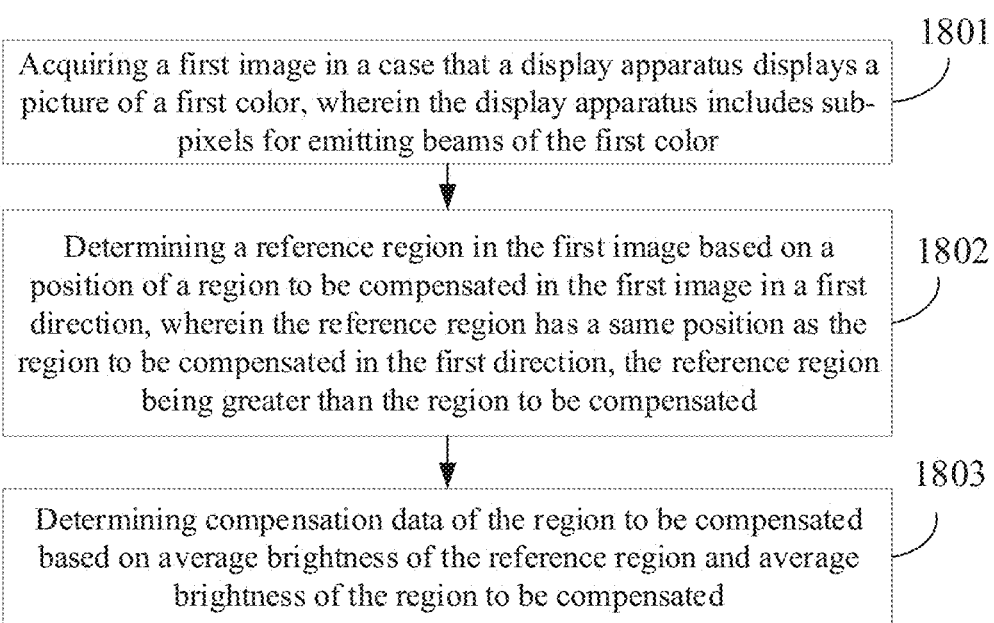

1801

Acquiring a first image in a case that a display apparatus displays a picture of a first color, wherein the display apparatus includes sub-pixels for emitting beams of the first color

1802

Determining a reference region in the first image based on a position of a region to be compensated in the first image in a first direction, wherein the reference region has a same position as the region to be compensated in the first direction, the reference region being greater than the region to be compensated

1803

Determining compensation data of the region to be compensated based on average brightness of the reference region and average brightness of the region to be compensated

FIG. 18

COMPENSATION DEVICE AND METHOD FOR DISPLAY APPARATUS, DISPLAY APPARATUS, AND COMPUTER STORAGE MEDIUM

CROSS-REFERENCE TO RELATED APPLICATION

The present disclosure is a U.S. national stage of international application No. PCT/CN2023/072372, filed on Jan. 16, 2023, the disclosure of which is herein incorporated by reference in its entirety.

TECHNICAL FIELD

The present disclosure relates to the field of display technologies, and in particular to a compensation device and method for a display apparatus, a display apparatus, and a computer storage medium.

BACKGROUND

When a display apparatus displays a picture, some regions in the picture may display abnormally (Mura) for various reasons, which needs to be compensated by the display device to reduce the effect of the abnormal display.

SUMMARY

Embodiments of the present disclosure provide a compensation device and method for a display apparatus, a display apparatus, and a computer storage medium. The technical solutions are as follows.

According to some embodiments of the present disclosure, a compensation device for a display apparatus is provided. The compensation device for the display apparatus includes an image-acquiring assembly and a control assembly.

The image-acquiring assembly is configured to acquire a first image in a case where the display apparatus displays a picture of a first color, wherein the display apparatus includes sub-pixels for emitting beams of the first color.

The control assembly is configured to determine a reference region in the first image based on a position of a region to be compensated in the first image in a first direction, wherein the reference region has a same position as the region to be compensated in the first direction, the reference region being greater than the region to be compensated.

The control assembly is configured to determine compensation data of the region to be compensated based on the average brightness of the reference region and the average brightness of the region to be compensated.

In some embodiments, the first image is rectangular, and a display abnormal region is provided at a position where at least one of two opposite edges of the first image is located, the first direction being perpendicular to the two opposite edges.

In some embodiments, the control assembly is further configured to:

determine a first coordinate of the region to be compensated in the first direction, wherein one coordinate axis of a coordinate system where the first coordinate is located is parallel to the first direction; and in a case that a distance, in the first direction, between the region to be compensated and an edge of the first image is greater than or equal to a specified distance, determine the reference region by using the first coordinate as a central coordinate of the reference region in the first direction, wherein the reference region is provided with a preset dimension; and the specified distance is one second of a length, in the first direction, of the reference region with the preset dimension; and in a case that the distance, in the first direction, between the region to be compensated and the edge of the first image is less than the specified distance, determine a region attached to the edge and having the preset dimension as the reference region.

In some embodiments, a center of the reference region is at a center of the first image in a second direction, the second direction being perpendicular to the first direction.

In some embodiments, a center of the reference region is between a center of the first image and the region to be compensated in a second direction, the second direction being perpendicular to the first direction; or the center of the reference region is on a side, distal to the region to be compensated, of the center of the first image in the second direction.

In some embodiments, the control assembly is further configured to:

determine, based on the position of the region to be compensated in the first direction, a strip-shaped region in which the region to be compensated is disposed, wherein the first image includes a plurality of strip-shaped regions distributed in the first direction, and each of the plurality of strip-shaped regions is provided with a preset reference region; and determine the preset reference region in the strip-shaped region in which the region to be compensated is disposed as the reference region.

In some embodiments, a center of the reference region is at a center of the first image in a second direction, the second direction being perpendicular to the first direction.

In some embodiments, a center of the reference region is between a center of the first image and the region to be compensated in a second direction, the second direction being perpendicular to the first direction; or the center of the reference region is on a side, distal to the region to be compensated, of the center of the first image in the second direction.

In some embodiments, the control assembly is further configured to:

determine the reference region in the first image based on the position of the region to be compensated in the first direction and in a second direction, wherein the reference region has a same position as the region to be compensated in the first direction and the second direction, the second direction being perpendicular to the first direction.

In some embodiments, the control assembly is further configured to:

determine a first coordinate of the region to be compensated in the first direction and a second coordinate of the region to be compensated in the second direction, wherein one coordinate axis of a coordinate system where the first coordinate and the second coordinate are located is parallel to the first direction, and another coordinate axis is parallel to the second direction; and determine a preset reference region, with a center nearest to the region to be compensated in the first image based on the first coordinate and the second coordinate, as the reference region, wherein the preset reference region is provided with a preset dimension specified for the reference region in advance.

In some embodiments, the control assembly is further configured to:

determine a first coordinate of the region to be compensated in the first direction and a second coordinate of the region to be compensated in the second direction, wherein one coordinate axis of a coordinate system where the first coordinate and the second coordinate are located is parallel to the first direction; and another coordinate axis is parallel to the second direction;

determine, based on the first coordinate and the second coordinate, a blocky region in which the region to be compensated is disposed, wherein the first image includes a plurality of blocky regions distributed transversally and longitudinally in the first direction and the second direction; and determine the blocky region in which the region to be compensated is disposed as the reference region.

In some embodiments, a length of the reference region ranges from a/10 to a/5 in the first direction, a being a length of the first image in the first direction.

In some embodiments, a length of the reference region ranges from b/10 to b/5 in a second direction, b being a length of the first image in the second direction and the second direction being perpendicular to the first direction.

According to some embodiments of the present disclosure, a display apparatus is provided. The display apparatus includes a display panel and a control assembly, wherein the display panel includes sub-pixels for emitting beams of a first color;

the control assembly is configured to acquire compensation data of a region to be compensated, wherein the compensation data is determined by: acquiring a first image in a case that the display apparatus displays a picture of the first color; determining a reference region in the first image based on a position of the region to be compensated in the first image in a first direction; and determining the compensation data based on average brightness of the reference region and average brightness of the region to be compensated; the reference region having a same position as the region to be compensated in the first direction and the reference region being greater than the region to be compensated; and the control assembly is configured to perform, based on the compensation data, compensation on the region to be compensated of the picture displayed in the display panel.

According to some embodiments of the present disclosure, a compensation method for a display apparatus is provided. The method includes:

acquiring a first image in a case that the display apparatus displays a picture of a first color, wherein the display apparatus includes sub-pixels for emitting beams of the first color;

determining a reference region in the first image based on a position of a region to be compensated in the first image in a first direction, wherein the reference region has a same position as the region to be compensated in the first direction, the reference region being greater than the region to be compensated; and determining compensation data of the region to be compensated based on average brightness of the reference region and average brightness of the region to be compensated.

In some embodiments, the first image is rectangular, and a display abnormal region is provided at a position where at least one of two opposite edges of the first image is located, the first direction being perpendicular to the two opposite edges; and In some embodiments, determining the reference region in the first image based on the position of the region to be compensated in the first image in the first direction includes:

determining a first coordinate of the region to be compensated in the first direction, wherein one coordinate axis of a coordinate system where the first coordinate is located is parallel to the first direction; and in a case that a distance, in the first direction, between the region to be compensated and an edge of the first image is greater than or equal to a specified distance, determining the reference region by using the first coordinate as a central coordinate of the reference region in the first direction, wherein the reference region is provided with a preset dimension; and the specified distance is one second of a length, in the first direction, of the reference region with the preset dimension; and in a case that the distance, in the first direction, between the region to be compensated and the edge of the first image is less than the specified distance, determining a region attached to the edge and having the preset dimension as the reference region.

In some embodiments, a center of the reference region is at a center of the first image in a second direction, the second direction being perpendicular to the first direction.

In some embodiments, a center of the reference region is between a center of the first image and the region to be compensated in a second direction, the second direction being perpendicular to the first direction; or the center of the reference region is on a side, distal to the region to be compensated, of the center of the first image in the second direction.

In some embodiments, determining the reference region in the first image based on the position of the region to be compensated in the first image in the first direction includes:

determining, based on the position of the region to be compensated in the first direction, a strip-shaped region in which the region to be compensated is disposed, wherein the first image includes a plurality of strip-shaped regions distributed in the first direction, and each of the plurality of strip-shaped regions is provided with a preset reference region; and determining the preset reference region in the strip-shaped region in which the region to be compensated is disposed as the reference region.

In some embodiments, a center of the reference region is at a center of the first image in a second direction, the second direction being perpendicular to the first direction.

In some embodiments, a center of the reference region is between a center of the first image and the region to be compensated in a second direction, the second direction being perpendicular to the first direction; or the center of the reference region is on a side, distal to the region to be compensated, of the center of the first image in the second direction.

In some embodiments, determining the reference region in the first image based on the position of the region to be compensated in the first image in the first direction includes:

determining the reference region in the first image based on the position of the region to be compensated in the first direction and in a second direction, wherein the reference region has a same position as the region to be compensated in the first direction and the second direction, the second direction being perpendicular to the first direction.

In some embodiments, determining the reference region in the first image based on the position of the region to be compensated in the first direction in the second direction includes:

determining a first coordinate of the region to be compensated in the first direction and a second coordinate of the region to be compensated in the second direction, wherein one coordinate axis of a coordinate system where the first coordinate and the second coordinate are located is parallel to the first direction, and another coordinate axis is parallel to the second direction; and determining a preset reference region, with a center nearest to the region to be compensated in the first image based on the first coordinate and the second coordinate, as the reference region, wherein the preset reference region is provided with a preset dimension specified for the reference region in advance.

In some embodiments, determining the reference region in the first image based on the position of the region to be compensated in the first direction in the second direction includes:

determining a first coordinate of the region to be compensated in the first direction and a second coordinate of the region to be compensated in the second direction, wherein one coordinate axis of a coordinate system where the first coordinate and the second coordinate are located is parallel to the first direction; and another coordinate axis is parallel to the second direction;

determining, based on the first coordinate and the second coordinate, a blocky region in which the region to be compensated is disposed, wherein the first image includes a plurality of blocky regions distributed transversally and longitudinally in the first direction and the second direction; and determining the blocky region in which the region to be compensated is disposed as the reference region.

In some embodiments, a length of the reference region ranges from a/10 to a/5 in the first direction, a being a length of the first image in the first direction.

In some embodiments, a length of the reference region ranges from b/10 to b/5 in a second direction, b being a length of the first image in the second direction and the second direction being perpendicular to the first direction.

According to some embodiments of the present disclosure, a compensation device for a display apparatus is provided. The compensation device for the display apparatus includes a processor and a memory storing at least one instruction, at least one program, a code set, or an instruction set, wherein the processor, when loading and executing the at least one instruction, the at least one program, the code set, or the instruction set, is caused to perform the above compensation method for the display apparatus.

According to some embodiments of the present disclosure, a non-transitory computer storage medium is provided. The non-volatile computer storage medium stores at least one instruction, at least one program, a code set, or an instruction set, wherein the at least one instruction, the at least one program, the code set, or the instruction set, when loaded and executed by a processor, causes the processor to perform the above compensation method for the display apparatus.

According to some embodiments of the present disclosure, a computer program product or a computer program is provided. The computer program product or the computer program includes computer instructions stored in a computer-readable storage medium. The computer instructions in the computer-readable storage medium, when read by a processor of a computer device, cause the processor to perform the method provided in the above optional implementations. reference region

BRIEF DESCRIPTION OF DRAWINGS

For clearer descriptions of the technical solutions in the embodiments of the present disclosure, the following briefly describes the accompanying drawings required for describing the embodiments. Apparently, the accompanying drawings in the following description show merely some embodiments of the present disclosure, and other drawings may be derived by a person skilled in the art from these accompanying drawings without creative efforts.

FIG. 18 is a method flowchart of a compensation method for a display apparatus.

The above accompanying drawings have shown specific embodiments of the present disclosure, and are to be described in detail as follows. These accompanying drawings and text descriptions are not intended in any way to limit the scope of the concept of the present disclosure, but to illustrate the conception of the present disclosure for those skilled in the art with reference to specific embodiments.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
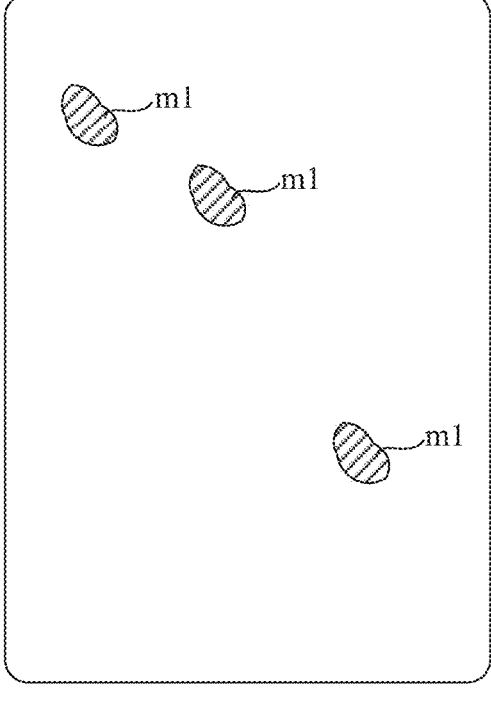
FIG. 1 is a schematic diagram of a picture displayed by a display apparatus.

When a display apparatus displays a picture, some regions in the picture may display abnormally (Mura) for various reasons. FIG. 1 is a schematic diagram of a picture displayed by a display apparatus, the displayed picture is a white picture, but the white picture includes a plurality of display abnormal regions m1. In this case, compensation needs to be performed on the display apparatus to reduce the effect of the abnormal display.

The display apparatus includes sub-pixels of a plurality of colors, for example, red sub-pixels, green sub-pixels, and blue sub-pixels. When compensation is performed by an existing compensation device for a display apparatus, the compensation is performed on pictures of different colors separately. After the compensation is performed on all the pictures of the colors, the effect of abnormal displaying can be reduced or even eliminated.

In some practices, the compensation device for the display apparatus includes a camera and a processor. The camera shoots a pure-color picture displayed by the display apparatus and acquires a shot image. The processor is configured to acquire the average brightness of the central region of the shot image and perform compensation on each region of the displayed picture of the display apparatus based on the average brightness. However, the flexibility of the above device in compensation is relatively low.

Figure 2:
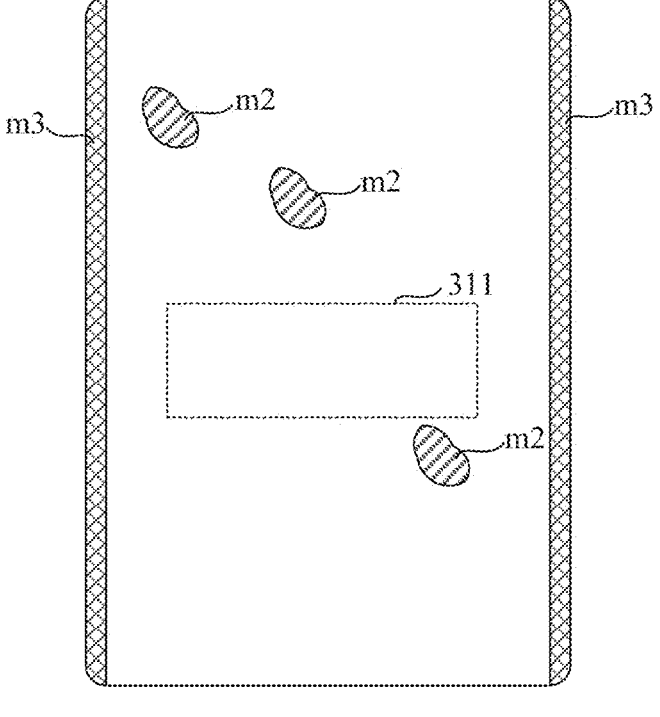
FIG. 2 is a schematic diagram of a shot image.
Figure 3:
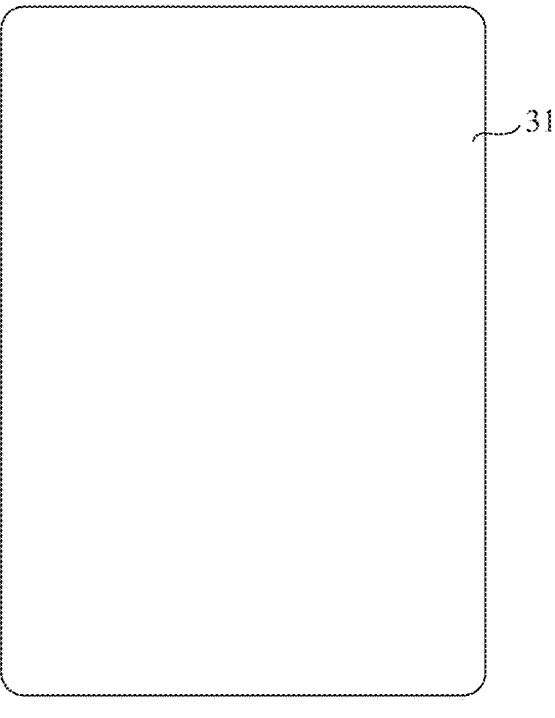
FIG. 3 is a schematic diagram of another shot image.

For example, when compensation is performed on a red picture, the display apparatus is controlled to display the red picture, and the red picture is shot by a camera in the compensation device for the display apparatus to acquire a shot image. For example, as shown in FIG. 2 that is a schematic diagram of a shot image, it can be learned from FIG. 2 that in addition to several display abnormal regions m2 similar to those in FIG. 1, the left and right edges of the shot image further have abnormal regions m3 with color cast. A processor in a compensation device for a display apparatus acquires the average brightness of the central region 311 of the shot image, determines compensation data of all regions to be compensated (each of regions to be compensated is a small region in the picture displayed by the display apparatus) on the displayed picture based on the average brightness, and then inputs the compensation data into the display apparatus. After the display apparatus performs compensation based on the compensation data, a shot image that displays a red picture is shown in FIG. 3 that is a schematic diagram of another shot image. It can be learned that after the compensation, brightness of all regions of the image 31 is basically consistent. However, in this compensation manner, compensation data is always determined by using the average brightness of the fixed central region of the displayed picture. As a result, the flexibility of this manner is lower. In addition, if the central region has a larger display abnormal region, the compensation effect of the entire displayed picture is poor.

Embodiments of the present disclosure provide a compensation device and method for a display apparatus, a display apparatus, and a computer storage medium, to resolve some problems in the above related art.

Figure 4:
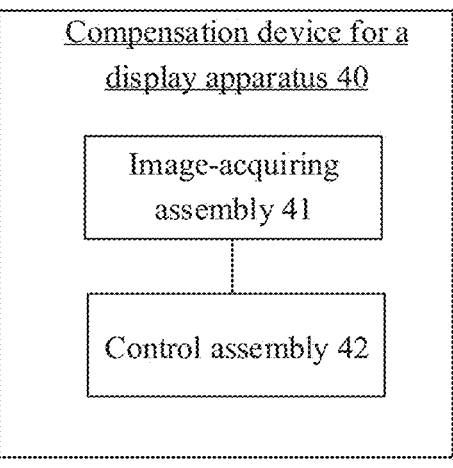
FIG. 4 is a schematic structural diagram of a compensation device for a display apparatus according to some embodiments of the present disclosure.
Figure 5:
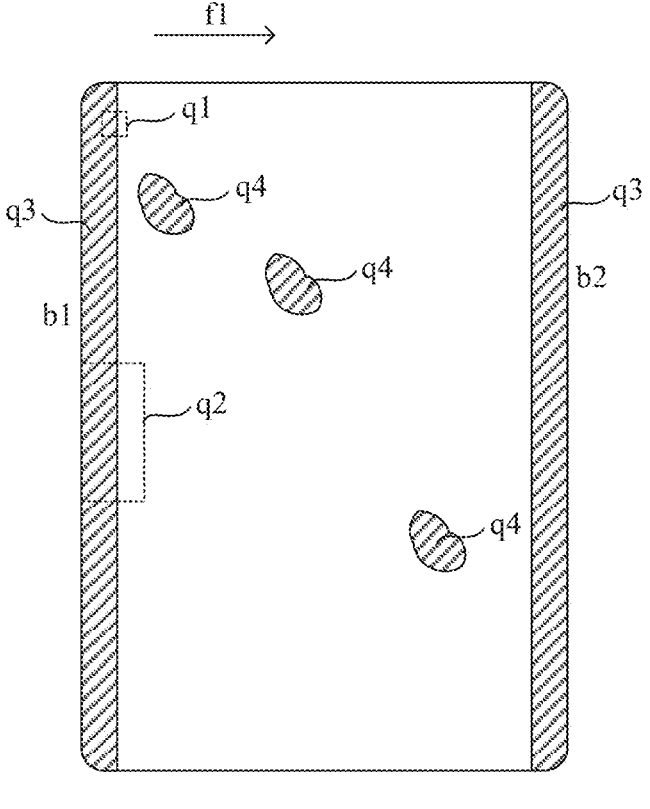
FIG. 5 is a schematic diagram of a first image according to some embodiments of the present disclosure.

FIG. 4 is a schematic structural diagram of a compensation device for a display apparatus according to some embodiments of the present disclosure. FIG. 5 is a schematic diagram of a first image according to some embodiments of the present disclosure. As shown in FIG. 4 and FIG. 5, the compensation device 40 for a display apparatus includes an image-acquiring assembly 41 and a control assembly 42.

The image-acquiring assembly 41 is configured to acquire a first image in the case that the display apparatus displays a picture of a first color, wherein the display apparatus includes sub-pixels for emitting beams of the first color.

The control assembly 42 is configured to determine a reference region q2 in the first image based on the position of a region to be compensated q1 in the first image in a first direction f1, wherein the reference region q2 has the same position as the region to be compensated q1 in the first direction f1; and the reference region q2 is greater than the region to be compensated q1.

The control assembly 42 is configured to determine compensation data of the region to be compensated based on the average brightness of the reference region q2 and the average brightness of the region to be compensated q1.

The compensation data determined by the control assembly 42 is used to enable the display apparatus to adjust a region corresponding to the region to be compensated in the displayed picture, such that the brightness of the region to be compensated is consistent with the average brightness of the reference region.

In addition, the above region to be compensated q1 is any region in the first image. The control assembly 42 sequentially divides some or all regions in the first image into a plurality of regions to be compensated, and determines compensation data of each region to be compensated in the above manner.

The image-acquiring assembly 41 includes a camera. The camera shoots a side of the picture displayed by the display apparatus, and transmits the shot image to the control assembly 42. Alternatively, the image-acquiring assembly 41 acquires the first image in other manners, for example, a data transmission manner, which is not limited in the embodiments of the present disclosure.

In summary, according to the compensation device for a display apparatus provided by the embodiments of the present disclosure, the control assembly determines a reference region in a first image acquired by the image-acquiring assembly based on the position of a region to be compensated in a first direction; then, the control assembly determines compensation data of the region to be compensated based on the average brightness of the reference region and the average brightness of the region to be compensated; and subsequently, the display apparatus performs compensation on the region to be compensated based on the compensation data during displaying. Because the reference region has the same position as the region to be compensated in the first direction, the position of the reference region varies with different positions of the region to be compensated, thereby improving the flexibility of the compensation device.

In addition, compared with the related art in which the position of the reference region is fixed, when the compensation device for a display apparatus according to the present disclosure determines compensation data, the position of the reference region used for reference is related to the position of a region to be compensated. In other words, when compensation is performed on regions to be compensated at different positions, the average brightness of the reference region used for reference also varies, and the average brightness is related to the position of the region to be compensated. In this way, the association between the compensation data and the region to be compensated is improved.

It should be noted that the first image is acquired by shooting a picture of a first color displayed by the display apparatus. The first image has the same shape as the picture displayed by the display apparatus (it may be ensured, by controlling a shooting angle or cutting, that the shapes of the first image and the displayed picture are consistent). Correspondingly, all positions (or regions) of the first image correspond to all positions (or regions) of the displayed picture, too. For example, the first image and the displayed picture have the same coordinate system. After coordinates of a position are determined in the first image, a corresponding position can be determined on the displayed picture based on the coordinates.

On this basis, after acquiring the compensation data of the region to be compensated, the compensation device for the display apparatus writes the compensation data into the display apparatus. The display apparatus performs compensation on a region corresponding to the region to be compensated in the displayed picture based on the compensation data.

In addition, because the reference region q2 is greater than the region to be compensated q1, the reference region q2 has the same position as the region to be compensated q1 in the first direction f1 in the embodiments of the present disclosure refers to: the region to be compensated q1 being disposed at least in a region defined by two extremum points of the reference region q2 in the first direction f1. As shown in FIG. 5, the two extremum points are the rightmost point and the leftmost point of the reference region q2 in the first direction f1. The region defined by the two extremum points is a region defined by two lines that pass the two extremum points and that are perpendicular to the first direction f1.

It should be also noted that, the average brightness of a region described in the embodiments of the present disclosure is the average value of brightness of all pixels in the region, wherein the average value is an arithmetic average value, a geometric average value, or an average value of another type, which is not limited in the embodiments of the present disclosure.

Figure 6:
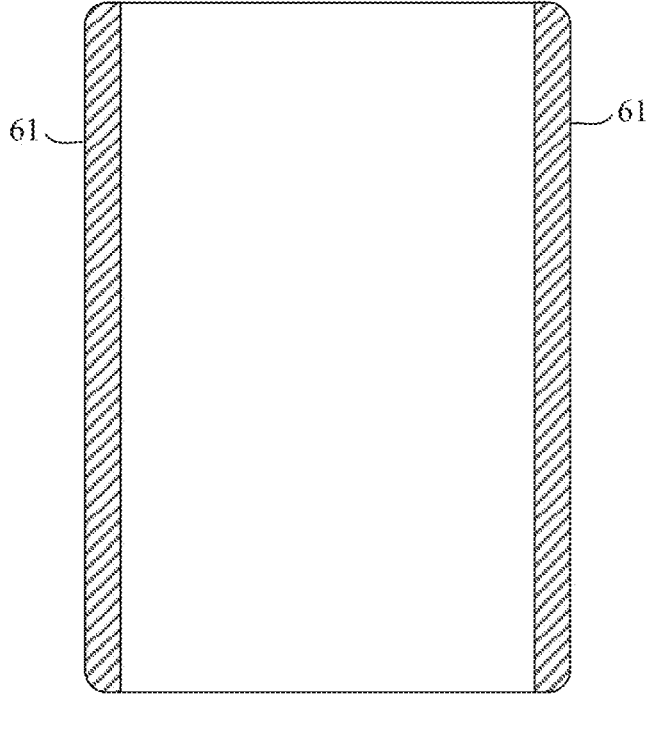
FIG. 6 is a schematic diagram of a red picture displayed by a display apparatus.

In some embodiments, the display apparatus includes a plurality of columns of transversally and longitudinally distributed pixels. Each pixel includes three types of sub-pixels: R (a red sub-pixel), G (a green sub-pixel), and B (a blue sub-pixel). The red sub-pixel and the blue sub-pixel are connected to the same source wire. Moreover, because a wire on the edge of a fan-out region (Fan-out) of the display panel is longer and has a larger load, the time for charging sub-pixels corresponding to an edge region of a displayed picture is insufficient (which is especially serious in a display apparatus having a high refresh rate). Thus, the brightness of the edge region is lower when the display panel displays a red picture and a blue picture. As shown in FIG. 6 that is a schematic diagram of a red picture displayed by a display apparatus, the brightness of an edge region 61 is lower than that of another region.

Figure 7:
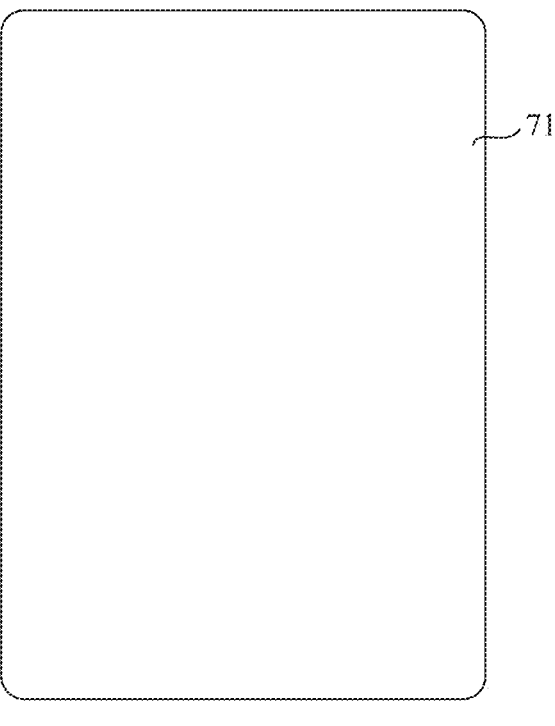
FIG. 7 is a schematic diagram of a white picture displayed by a display apparatus.

However, FIG. 7 is a schematic diagram of a white picture displayed by a display apparatus, when the display apparatus displays the white picture 71 (substantially red sub-pixels, green sub-pixels, and blue sub-pixels being lighted at the same time). The same source wire connected to the red sub-pixels and the blue sub-pixels is switched back and forth to charge the red sub-pixels and the blue sub-pixels; and charging time can basically meet a requirement, such that when the white picture is displayed, no abnormal displaying such as color cast appears on an edge.

Figure 8:
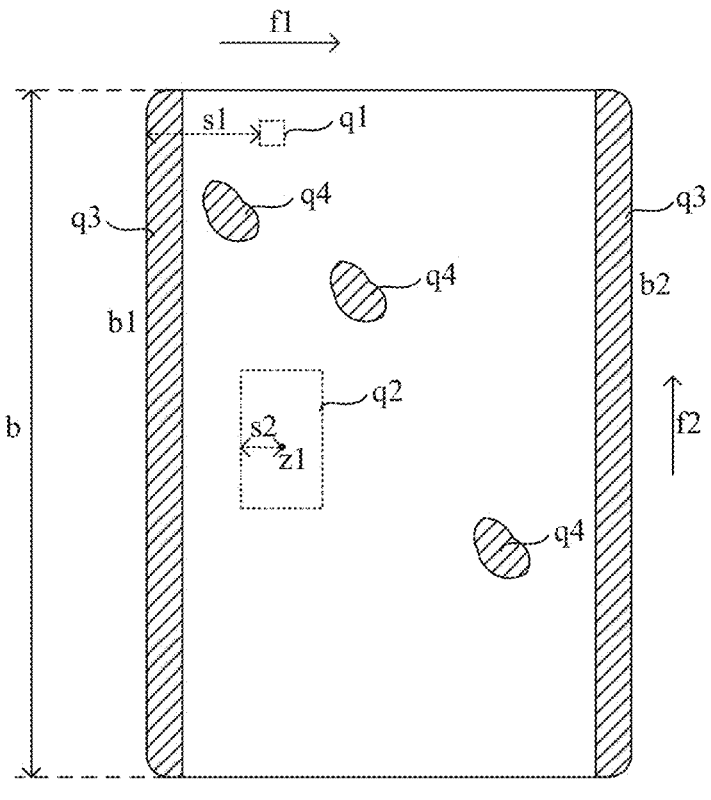
FIG. 8 is a schematic diagram of another first image according to some embodiments of the present disclosure.

As a result, the following phenomenon occurs: abnormal display such as color cast appears on edges of some pure-color pictures, but no abnormal display such as color cast appears in a white picture. In this case, if the compensation manner in the above related art is applied, anomaly of color cast may appear on the edge of the white picture displayed by the display apparatus, which makes the compensation effect of the above compensation device for a display apparatus poor. For example, FIG. 8 is a schematic diagram of a white picture displayed by a display apparatus after compensation. An edge has an abnormal region 81 with color cast.

The compensation device for the display apparatus provided in the embodiments of the present disclosure can resolve the problem.

In some embodiments, as shown in FIG. 5, the first image is rectangular; and the position of at least one of two opposite edges (b1 and b2) of the first image is provided with an display abnormal region q3 (FIG. 5 shows a case in which both the two edges b1 and b2 are provided with display abnormal regions, which is not limited in the embodiments of the present disclosure). In addition, the first image further includes a plurality of other display abnormal regions q4; and a first direction f1 is perpendicular to the two opposite edges (b1 and b2). In view of this case, in the compensation device for the display apparatus provided in the embodiments of the present disclosure, when determining the compensation data of the region to be compensated that overlaps with the display abnormal region q3, the control assembly determines the compensation data based on the average brightness of the reference region q2 that overlaps with the display abnormal region q3, such that the effect of the other display abnormal regions q4 can be reduced without adjusting the brightness of the display abnormal regions q3 of the edges. Therefore, the problem of color cast on the edge can be avoided when the display apparatus displays the white picture.

When the first direction f1 is a transversal direction, the compensation device for the display apparatus provided in the embodiments of the present disclosure can resolve the problem that color cast appears on the left and right sides of a picture displayed by a display apparatus (for example, the sides are reddish or greenish). When the first direction f1 is a longitudinal direction, the compensation device for the display apparatus provided in the embodiments of the present disclosure can resolve the problem that color cast appears on the upper and lower sides of the picture displayed by the display apparatus.

In the embodiments of the present disclosure, the control assembly determines the reference region in at least four manners that are described below separately.

Figure 9:
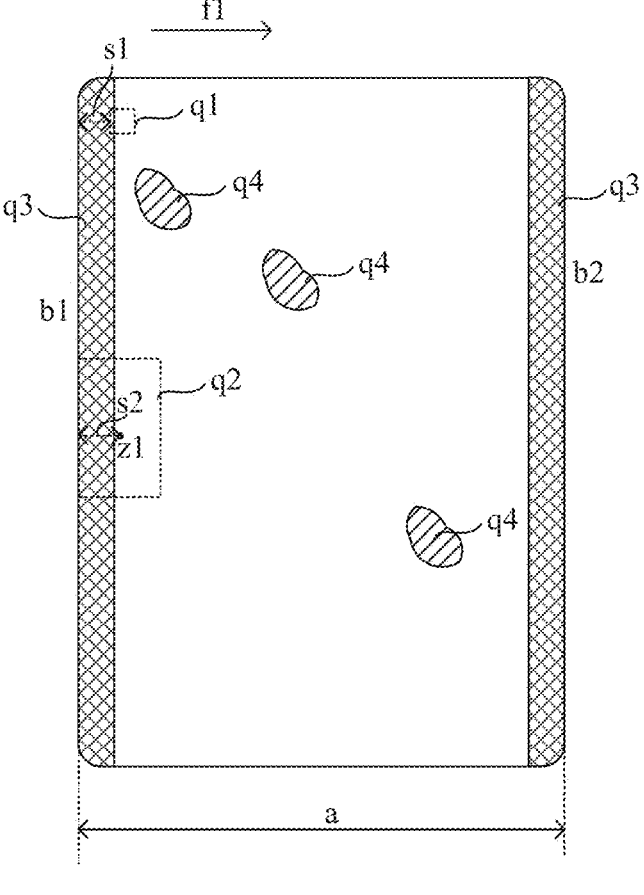
FIG. 9 is a schematic diagram of still another first image according to some embodiments of the present disclosure.

Manner 1: as shown in FIG. 8 that is a schematic diagram of still another first image according to some embodiments of the present disclosure, the control assembly is further configured to:

determine a first coordinate of the region to be compensated q1 in the first direction f1, wherein one coordinate axis of a coordinate system where the first coordinate is located is parallel to the first direction f1; and in the case that the distance s1, in the first direction f1, between the region to be compensated q1 and an edge of the first image is greater than or equal to a specified distance s2, determine the reference region q2 by using the first coordinate as the central coordinate of the reference region q2 in the first direction f1, wherein the reference region q2 is provided with a preset dimension (namely, a dimension that is specified in advance); the specified distance s2 is one second of the length, in the first direction f1, of the reference region q2 with the preset dimension; and z1 in FIG. 8 is the geometric center of the reference region q2; or in the case that the distance s1, in the first direction f1, between the region to be compensated q1 and the edge of the first image is less than the specified distance s2, determine a region attached to the edge and having the preset dimension as the reference region q2, as shown in FIG. 9 that is a schematic diagram of still another first image according to some embodiments of the present disclosure.

In this manner, the association between the position of the region to be compensated q1 and the reference region q2 in the first direction f1 can be improved.

In addition, this is a manner of determining the reference region q2. In the embodiments of the present disclosure, it is considered that, the determined reference region q2 corresponds to the region to be compensated q1, and each region to be compensated q1 corresponds to one reference region q2.

In some embodiments, the length of the reference region q2 ranges from a/10 to a/5 in the first direction f1; and a is the length of the first image in the first direction f1. Within the range of the length, the reference region q2 with an appropriate dimension is enabled to provide the reference for the brightness of the region to be compensated q1.

As shown in FIG. 8, the center z1 of the reference region q2 is at the center of the first image in a second direction f2; and the second direction f2 is perpendicular to the first direction f1. Because the probability that anomaly appears on an edge of a displayed picture is greater than the probability that anomaly appears at the center of the picture, when the center z1 of the reference region q2 in the second direction f2 is at the center of the first image, the compensation effect of the compensation data determined based on the average brightness of the reference region q2 can be improved. Therefore, the display effect of the display apparatus is improved.

In some embodiments, the length of the reference region q2 ranges from b/10 to b/5 in the second direction f2; b is the length of the first image in the second direction f2; and the second direction f2 is perpendicular to the first direction f1. Within the range of the length, the reference region q2 with an appropriate dimension is enabled to provide the reference for the brightness of the region to be compensated q1.

Figure 10:
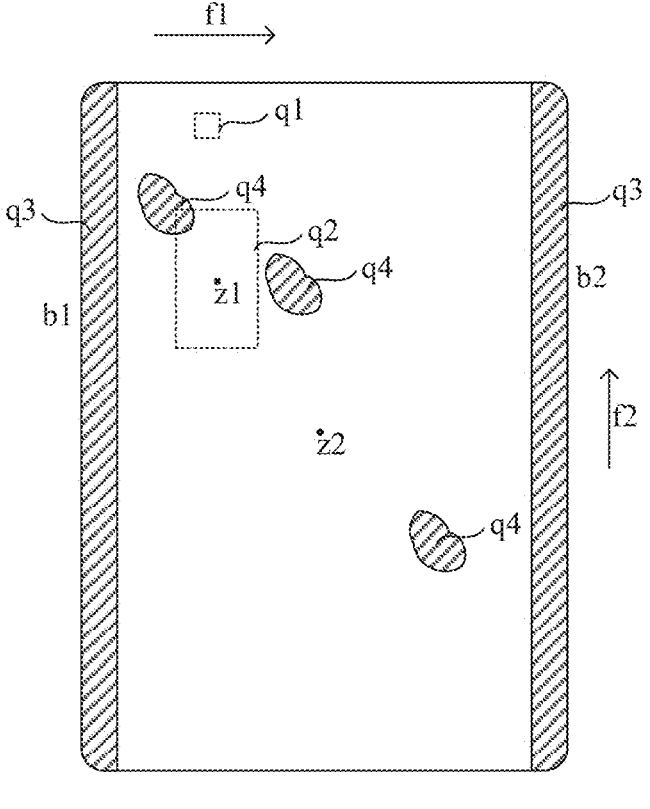
FIG. 10 is a schematic diagram of still another first image according to some embodiments of the present disclosure.

Certainly, in the embodiments of the present disclosure, the center of the reference region is at another position. For example, as shown in FIG. 10 that is a schematic diagram of still another first image according to some embodiments of the present disclosure, the center z1 of the reference region q2 is between the center z2 of the first image (the center is the geometric center or the barycenter of the first image) and the region to be compensated q1 in the second direction f2; and the second direction f2 is perpendicular to the first direction f1.

Figure 11:
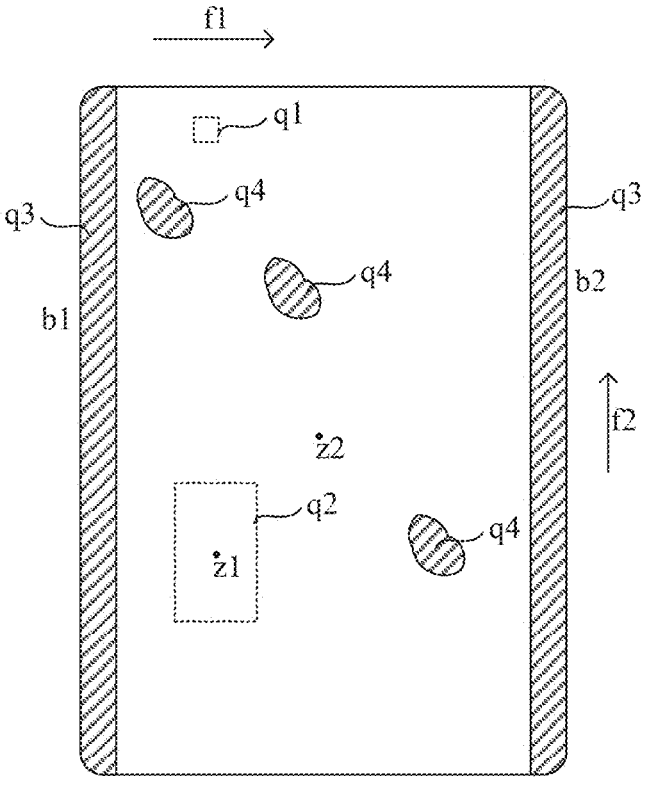
FIG. 11 is a schematic diagram of still another first image according to some embodiments of the present disclosure.

As shown in FIG. 11 that is a schematic diagram of still another first image according to some embodiments of the present disclosure, the center z1 of the reference region q2 is on the side, distal to the region to be compensated q1, of the center of the first image in the second direction f2.

Figure 12:
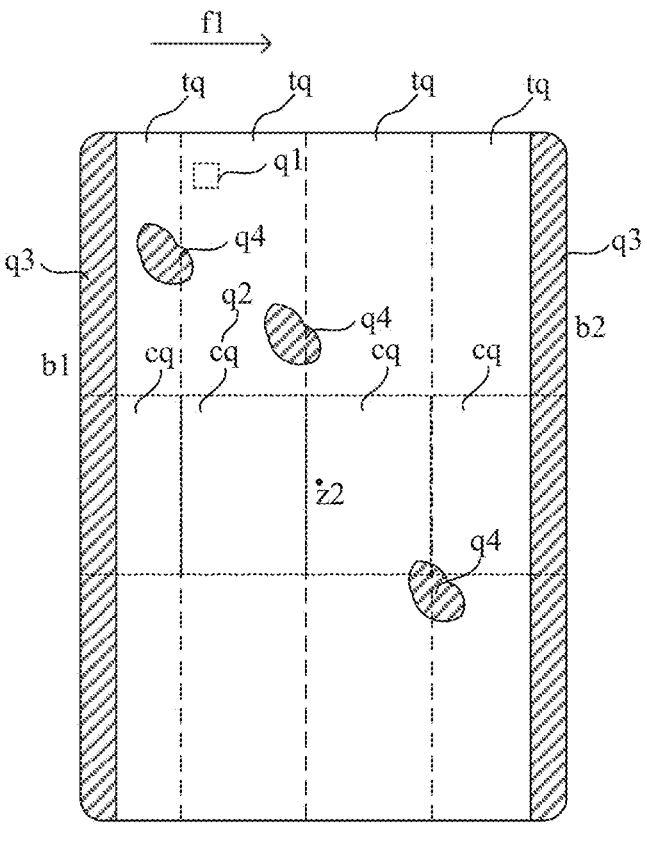
FIG. 12 is a schematic diagram of still another first image according to some embodiments of the present disclosure.

Manner 2: as shown in FIG. 12 that is a schematic diagram of still another first image according to some embodiments of the present disclosure, the control assembly is further configured to:

determine, based on the position of the region to be compensated q1 in the first direction f1, a strip-shaped region tq in which the region to be compensated q1 is disposed, wherein the first image includes a plurality of strip-shaped regions tq distributed in the first direction f1; and each strip-shaped region tq has one preset reference region cq; and determine the preset reference region cq in the strip-shaped region tq in which the region to be compensated q1 is disposed as the reference region q2.

In this manner, the control assembly determines the plurality of strip-shaped regions tq in the first image in advance as well as the preset reference region cq in each strip-shaped region tq, so that the reference region q2 can be determined based on the strip-shaped region tq in which the region to be compensated q1 is disposed.

Similar to the foregoing manner of determining the reference region, in the manner of determining the reference region shown in FIG. 11, the reference region is alternatively disposed at various positions in the second direction. For example, the center of the reference region in the second direction is at the center of the first image.

Alternatively, the center of the reference region is between the center of the first image and the region to be compensated in the second direction, the second direction being perpendicular to the first direction; or the center of the reference region is on the side, distal to the region to be compensated, of the center of the first image in the second direction.

Figure 13:
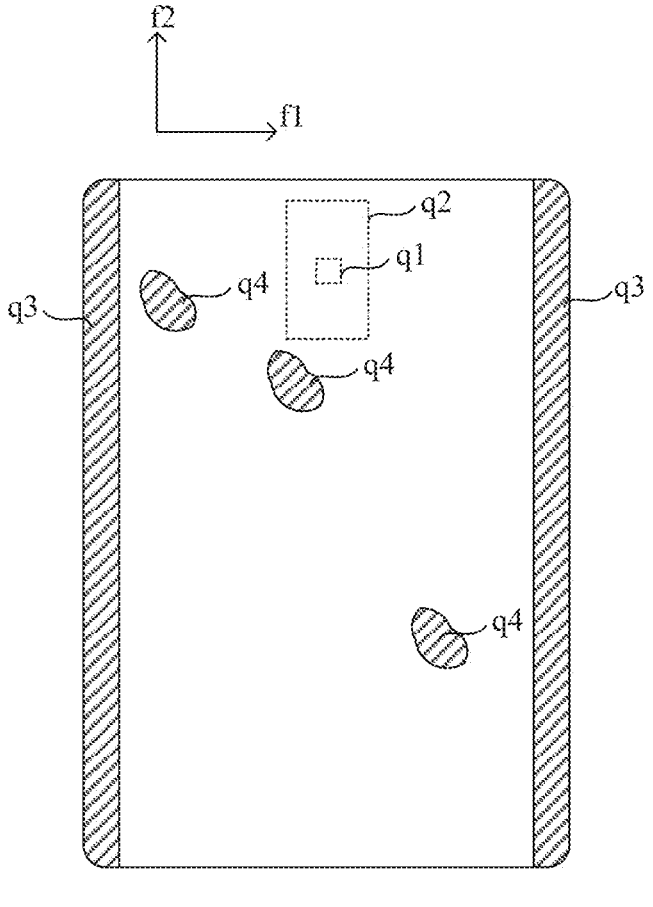
FIG. 13 is a schematic diagram of still another first image according to some embodiments of the present disclosure.

Manner 3: As shown in FIG. 13 that is a schematic diagram of still another first image according to some embodiments of the present disclosure, the control assembly is further configured to:

determine the reference region q2 in the first image based on the position in the first direction f1 and in the second direction f2, of the region to be compensated q1, wherein the second direction f2 is perpendicular to the first direction f1; and the reference region q2 has a same position as the region to be compensated q1 in the first direction f1 and the second direction f2. In this case, the reference region q2 always surrounds the region to be compensated.

The reference region q2 determined in this manner is used to resolve the problem that color cast and brightness difference exist on all of four edges of a displayed picture of the display apparatus. Such problems may occur in large-sized display apparatuses. The compensation device of the display apparatus provided in the embodiments of the present disclosure can resolve such problems.

In some embodiments, the control assembly is further configured to:

determine a first coordinate of the region to be compensated q1 in the first direction f1 and a second coordinate of the region to be compensated q1 in the second direction f2 (for example, the first coordinate is an x coordinate, and the second coordinate is a y coordinate), wherein one coordinate axis (for example, an x-axis) of a coordinate system where the first coordinate and the second coordinate are located is parallel to the first direction f1; and the other coordinate axis (for example, a y-axis) is parallel to the second direction f2; and determine, a preset reference region with a center nearest to the region to be compensated in the first image based on the first coordinate and the second coordinate, as the reference region, wherein the preset reference region is provided with a preset dimension specified for the reference region q2 in advance.

Figure 14:
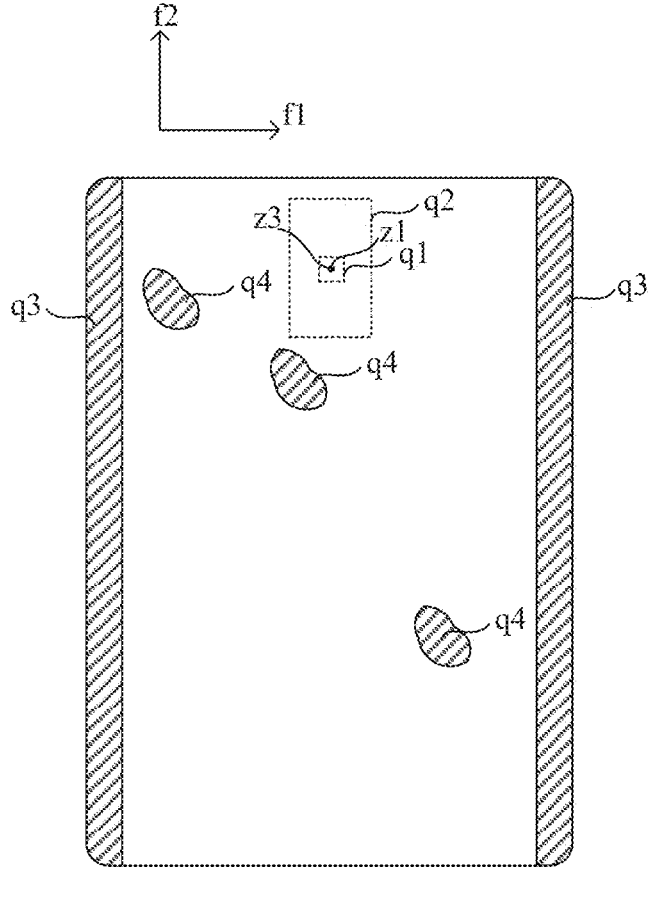
FIG. 14 is a schematic diagram of still another first image according to some embodiments of the present disclosure.

There are two cases for the preset reference region whose center is nearest to the region to be compensated q1 and that is provided with the preset dimension. Case 1: As shown in FIG. 14 that is a schematic diagram of still another first image according to some embodiments of the present disclosure, both the distances between the region to be compensated q1 and two edges (namely, the left and right edges) of the first image in the first direction f1 are greater than or equal to one half of the length of the reference region q2 in the first direction f1, and both the distances between the region to be compensated q1 and two edges (namely, the upper and lower edges) of the first image in the second direction f2 are greater than or equal to one half of the length of the reference region q2 in the second direction f2. In this case, the position of the reference region q2 (the position of the reference region q2 is the position of the geometric center z1 of the reference region q2) overlaps with the center z3 of the region to be compensated q1 (that is, the distance between the center z1 of the reference region q2 and the region to be compensated q1 is zero).

Figure 15:
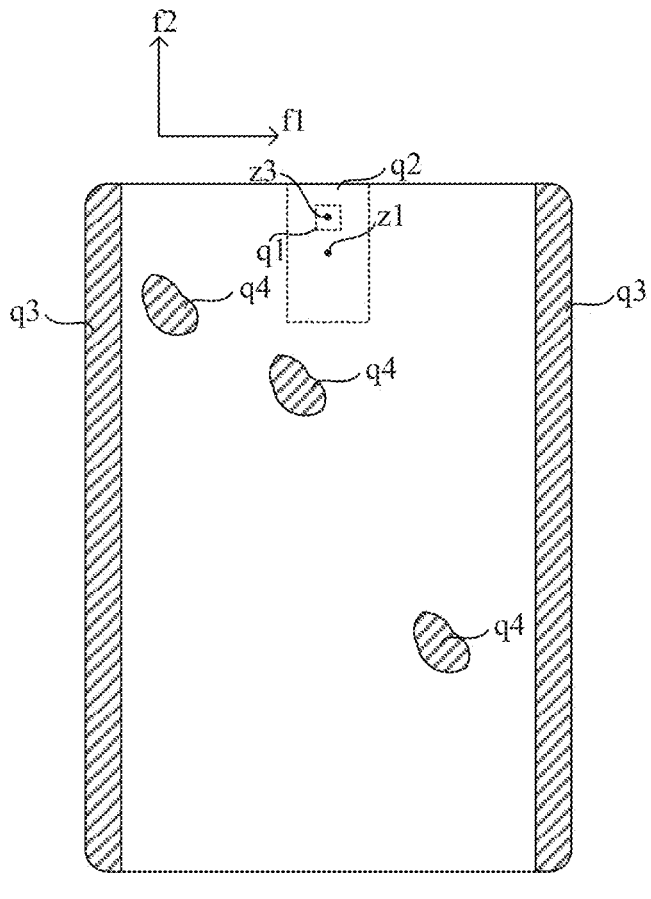
FIG. 15 is a schematic diagram of still another first image according to some embodiments of the present disclosure.

Case 2: As shown in FIG. 15 that is a schematic diagram of still another first image according to some embodiments of the present disclosure, the distance between the region to be compensated q1 and one edge of the first image in the first direction f1 is less than one-half of the length of the reference region q2 in the first direction f1; and/or the distance between the region to be compensated q1 and one edge of the first image in the second direction f2 is less than one half of the length of the reference region q2 in the second direction f2. In this case, the center z1 of the reference region q2 is close to the center z3 of the region to be compensated q1 as far as possible.

Figure 16:
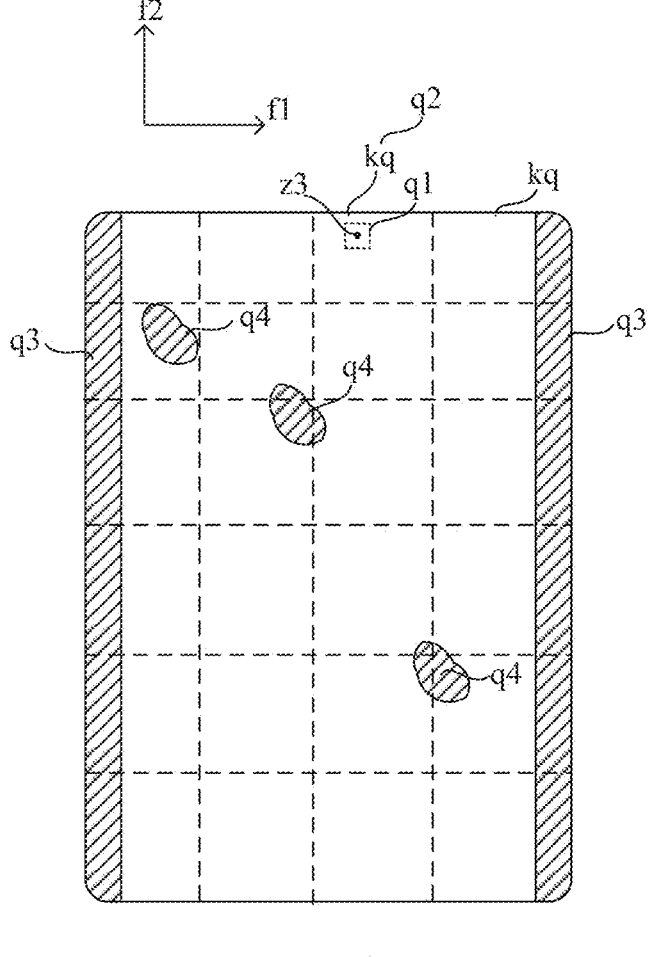
FIG. 16 is a schematic diagram of still another first image according to some embodiments of the present disclosure.

Manner 4: As shown in FIG. 16 that is a schematic diagram of still another first image according to some embodiments of the present disclosure, the control assembly is further configured to:

determine a first coordinate of the region to be compensated q1 in the first direction f1 and a second coordinate of the region to be compensated q1 in the second direction f2 (for example, the first coordinate is an x coordinate, and the second coordinate is a y coordinate), wherein one coordinate axis (for example, an x-axis) of a coordinate system where the first coordinate and the second coordinate are located is parallel to the first direction f1; and another coordinate axis (for example, a y-axis) is parallel to the second direction f2; the coordinates of the region to be compensated q1 is the coordinates of a point in the region to be compensated q1, and the point is the center z3 or a point at another position (for example, a vertex of an edge);

determine, based on the first coordinate and the second coordinate, a blocky region kq in which the region to be compensated q1 is disposed, wherein the first image includes a plurality of blocky regions kq distributed transversally and longitudinally in the first direction f1 and the second direction f2; and determine the blocky region kq in which the region to be compensated q1 is disposed as the reference region q2.

Similar to the above manner 2, this manner includes: dividing the first image into the plurality of blocky regions kq in advance; and then, determining, based on the transversal and longitudinal coordinates of the region to be compensated q1, the blocky region kq in which the region to be compensated q1 is disposed. Subsequently, the blocky region kq in which the region to be compensated q1 is disposed is determined as the reference region q2. This manner is similar to third manner and is used to resolve the problem that color cast and brightness difference exist on each of four edges of a displayed picture of the display apparatus.

The displayed picture of the display apparatus includes a plurality of regions to be compensated. In the embodiments of the present disclosure, the control assembly determines reference regions corresponding to the plurality of regions to be compensated in at least one of the above manners.

In summary, according to the compensation device for a display apparatus provided by the embodiments of the present disclosure, the control assembly determines a reference region in a first image acquired by the image-acquiring assembly based on the position of a region to be compensated in a first direction; then, the control assembly determines compensation data of the region to be compensated based on the average brightness of the reference region and the average brightness of the region to be compensated; and subsequently, the display apparatus performs compensation on the region to be compensated based on the compensation data during displaying. Because the reference region has the same position as the region to be compensated in the first direction, the position of the reference region varies with different positions of the region to be compensated, thereby improving the flexibility of the compensation device.

In addition, the compensation device for the display apparatus provided in the embodiments of the present disclosure is applicable to perform compensation on the display apparatus having a high refresh rate (for example, the display apparatus whose refresh rate is greater than or equal to 60 Hertz), to avoid the problem that abnormal displaying such as color cast appears in the display apparatus of the high refresh rate.

Figure 17:
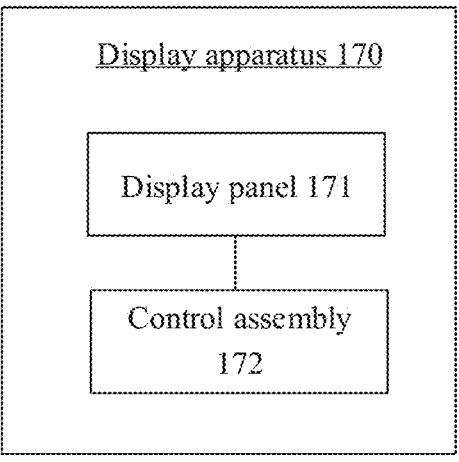
FIG. 17 is a schematic structural diagram of a display apparatus according to some embodiments of the present disclosure.

FIG. 17 is a schematic structural diagram of a display apparatus according to some embodiments of the present disclosure. The display apparatus 170 includes a display panel 171 and a control assembly 172.

The display panel 171 includes sub-pixels for emitting beams of a first color.

The control assembly 172 is configured to acquire compensation data of a region to be compensated, wherein the compensation data is determined by: acquiring a first image in the case that the display apparatus displays a picture of the first color; determining a reference region in the first image based on a position of the region to be compensated in the first image in a first direction; and determining the compensation data based on average brightness of the reference region and average brightness of the region to be compensated; the reference region having a same position as the region to be compensated in the first direction and the reference region being greater than the region to be compensated; and the control assembly 172 is configured to perform, based on the compensation data, compensation on the region to be compensated of the picture displayed in the display panel.

In summary, the display apparatus provided in the embodiments of the present disclosure performs, based on the compensation data, compensation on the region to be compensated of the picture displayed in the display panel, wherein the compensation data of the region to be compensated is determined based on the average brightness of the reference region and the average brightness of the region to be compensated. In addition, because the reference region has the same position as the region to be compensated in the first direction, the position of the reference region varies with different positions of the region to be compensated, thereby improving the flexibility of compensation preformed on the region to be compensated by the display apparatus.

The problem that color cast appears on two opposite edges of the displayed picture of the display apparatus is caused by the following aspects: in one aspect, the loads of different wires are different because the lengths of wires at different positions of a fan-out region are inconsistent. On this basis, in the display apparatus provided in the embodiments of the present disclosure, the wires in the fan-out region are adjusted to reduce load difference among a plurality of wires in the fan-out region, such that loads of a source wire are uniform.

In another aspect, the red sub-pixel and the blue sub-pixel are not charged sufficiently through the source wire. On this basis, in the display apparatus provided in the embodiments of the present disclosure, capacitance compensation is increased to ensure the charging effects of the red sub-pixel and the blue sub-pixel.

FIG. 18 is a method flowchart of a compensation method for a display apparatus. The method is applicable to the compensation device for a display apparatus provided in the above embodiments. The method includes the following steps.

In step 1801, a first image is acquired in a case where a display apparatus displays a picture of a first color, wherein the display apparatus includes sub-pixels for emitting beams of the first color.

In step 1802, a reference region in the first image is determined based on the position of a region to be compensated in the first image in a first direction, wherein the reference region has a same position as the region to be compensated in the first direction, the reference region being greater than the region to be compensated.

In step 1803, compensation data of the region to be compensated is determined based on the average brightness of the reference region and the average brightness of the region to be compensated.

In some embodiments, the first image is rectangular; and a display abnormal region is provided at a position where at least one of two opposite edges of the first image is located, the first direction being perpendicular to the two opposite edges.

In some embodiments, the above step 1801 includes:

determining a first coordinate of the region to be compensated in the first direction, wherein one coordinate axis of a coordinate system where the first coordinate is located is parallel to the first direction; and in a case that a distance, in the first direction, between the region to be compensated and an edge of the first image is greater than or equal to a specified distance, determining the reference region by using the first coordinate as a central coordinate of the reference region in the first direction, wherein the reference region is provided with a preset dimension; and the specified distance is one second of a length, in the first direction, of the reference region with the preset dimension; and in a case that the distance, in the first direction, between the region to be compensated and the edge of the first image is less than the specified distance, determining a region attached to the edge and having the preset dimension as the reference region.

In some embodiments, the center of the reference region is at the center of the first image in a second direction, the second direction being perpendicular to the first direction.

In some embodiments, the center of the reference region is between the center of the first image and the region to be compensated in a second direction, the second direction being perpendicular to the first direction; or the center of the reference region is on the side, distal to the region to be compensated, of the center of the first image in the second direction.

In some embodiments, the above step 1801 includes:

determining, based on the position of the region to be compensated in the first direction, a strip-shaped region in which the region to be compensated is disposed, wherein the first image includes a plurality of strip-shaped regions distributed in the first direction; and each of the plurality of strip-shaped regions is provided with a preset reference region; and determining a preset reference region in the strip-shaped region in which the region to be compensated is disposed as the reference region.

In some embodiments, the center of the reference region is at the center of the first image in a second direction, the second direction being perpendicular to the first direction.

In some embodiments, the center of the reference region is between the center of the first image and the region to be compensated in a second direction, the second direction being perpendicular to the first direction; or the center of the reference region is on the side, distal to the region to be compensated, of the center of the first image in the second direction.

In some embodiments, the above step 1801 includes:

determining the reference region in the first image based on the position, in the first direction and in a second direction, of the region to be compensated, wherein the reference region has a same position as the region to be compensated in the first direction and the second direction, the second direction being perpendicular to the first direction.

In some embodiments, the above step of determining the reference region in the first image based on the position of the region to be compensated in the first direction and in the second direction includes:

determining a first coordinate of the region to be compensated in the first direction and a second coordinate of the region to be compensated in the second direction, wherein one coordinate axis of a coordinate system where the first coordinate and the second coordinate are located is parallel to the first direction, and another coordinate axis is parallel to the second direction; and determining, a preset reference region with a center nearest to the region to be compensated in the first image based on the first coordinate and the second coordinate, as the reference region, wherein the preset reference region is provided with a preset dimension specified for the reference region in advance.

In some embodiments, the above step of determining the reference region in the first image based on the position of the region to be compensated in the first direction and in the second direction includes:

determining a first coordinate of the region to be compensated in the first direction and a second coordinate of the region to be compensated in the second direction, wherein one coordinate axis of a coordinate system where the first coordinate and the second coordinate are located is parallel to the first direction; and another coordinate axis is parallel to the second direction;

determining, based on the first coordinate and the second coordinate, a blocky region in which the region to be compensated is disposed, wherein the first image includes a plurality of blocky regions distributed transversally and longitudinally in the first direction and the second direction; and determining the blocky region in which the region to be compensated is disposed as the reference region.

In some embodiments, the length of the reference region ranges from a/10 to a/5 in the first direction; and a is the length of the first image in the first direction.

In some embodiments, the length of the reference region ranges from b/10 to b/5 in the second direction; b is the length of the first image in the second direction; and the second direction is perpendicular to the first direction.

In summary, according to the compensation method for a display apparatus provided in the embodiments of the present disclosure, a reference region in an acquired first image is determined based on the position of a region to be compensated in a first direction; then, a control assembly determines compensation data of the region to be compensated based on the average brightness of the reference region and the average brightness of the region to be compensated; and subsequently, the display apparatus performs compensation on the region to be compensated based on the compensation data during displaying. Because the reference region has the same position as region to be compensated in the first direction, the position of the reference region varies with different positions of the region to be compensated, thereby improving the flexibility of the compensation device.

In addition, compared with the related art in which the position of the reference region is fixed, when the compensation device for a display apparatus according to the present disclosure determines compensation data, the position of the reference region used for reference is related to the position of a region to be compensated. In other words, when compensation is performed on regions to be compensated at different positions, average brightness of the reference region used for reference also varies, and the average brightness is related to the position of the region to be compensated. In this way, the association between the compensation data and the region to be compensated is improved.

According to another aspect of the embodiments of the present disclosure, a compensation device for a display apparatus is provided. The compensation device for the display apparatus includes a processor and a memory storing at least one instruction, at least one program, a code set, or an instruction set, wherein the processor, when loading and executing the at least one instruction, the at least one program, the code set, or the instruction set, is caused to perform the above compensation method for the display apparatus.

According to still another aspect of the embodiments of the present disclosure, a non-transitory computer storage medium is provided. The non-volatile computer storage medium stores at least one instruction, at least one program, a code set, or an instruction set, wherein the at least one instruction, the at least one program, the code set, or the instruction set, when loaded and executed by a processor, causes the processor to perform the above compensation method for the display apparatus.

According to still another aspect of the embodiments of the present disclosure, a computer program product or a computer program is provided. The computer program product or the computer program includes computer instructions stored in a computer-readable storage medium. The computer instructions in the computer-readable storage medium, when read by a processor of a computer device, cause the processor to perform the method provided in the above optional implementations.

In the present disclosure, the term "and/or" is merely an association relationship of associated objects, indicating that there may be three types of relationships. For example, A and/or B may indicate three cases: only A exists, both A and B exist, and only B exists. In addition, the character "/" in the present disclosure generally indicates that the associated objects are in an "or" relationship.

In the present disclosure, the term "at least one of A and B" is merely an association relationship of associated objects, indicating that there may be three types of relationships. For example, "at least one of A and B" may indicate three cases: only A exists, both A and B exist, and only B exists. Similarly, "at least one of A, B, and C" indicates that there may be seven types of relationships: only A exists, only B exists, only C exists, both A and B exist, both A and C exist, both C and B exist, and all of A, B, and C exists. Similarly, "at least one of A, B, C and D" indicates that there may be fifteen types of relationships: only A exists, only B exists, only C exists, only D exists, both A and B exist, both A and C exist, both A and D exist, both C and B exist, both D and B exist, both C and D exist, all of A, B, and C exist, all of A, B, and D exist, all of A, C, and D exist, all of B, C, and D exist, and all of A, B, C, and D exist.

In the present disclosure, the terms "first", "second", "third", and "fourth" are only used for descriptive purposes and cannot be understood as indicating or implying relative importance. Unless otherwise defined, the term "a plurality of" refers to two or more.

In the several embodiments provided in the present disclosure, it should be understood that the disclosed apparatus and method may be implemented in other manners. For example, the described apparatus embodiment is merely an example. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

A person of ordinary skill in the art can understand that all or some of the steps of implementing the above embodiments can be completed by hardware, or can be completed by instructing related hardware by a program. The program can be stored in a computer-readable storage medium. The above-mentioned storage medium may be a read-only memory, a magnetic disk, a compact disc, or the like.

Described above are merely optional embodiments of the present disclosure, but are not intended to limit the present disclosure. Any modifications, equivalent replacements, improvements and the like made within the spirit and principle of the present disclosure shall be included within the scope of protection of the present disclosure.

What is claimed is:

1. A compensation device for a display apparatus, comprising an image-acquiring assembly and a control assembly, wherein the image-acquiring assembly is configured to acquire a first image in a case that the display apparatus displays a picture of a first color, wherein the display apparatus comprises sub-pixels for emitting beams of the first color;

the control assembly is configured to determine a reference region in the first image based on a position of a region to be compensated in the first image in a first direction, wherein the reference region has a same position as the region to be compensated in the first direction, the reference region being greater than the region to be compensated;

the control assembly is configured to determine compensation data of the region to be compensated based on average brightness of the reference region and average brightness of the region to be compensated, wherein the compensation data of the region to be compensated is configured to enable the display apparatus to adjust a region corresponding to the region to be compensated, such that brightness of the region to be compensated is consistent with average brightness of the reference region, and the region to be compensated is any region in the first image, and the position of the reference region varies with the position of the region to be compensated; and the control assembly is further configured to: determine, based on the position of the region to be compensated in the first direction, a strip-shaped region in which the region to be compensated is disposed, wherein the first image comprises a plurality of strip-shaped regions distributed in the first direction, and each of the plurality of strip-shaped regions is provided with a preset reference region; and determine the preset reference region in the strip-shaped region in which the region to be compensated is disposed as the reference region.

2. The compensation device according to claim 1, wherein the first image is rectangular, and a display abnormal region is provided at a position where at least one of two opposite edges of the first image is located, the first direction being perpendicular to the two opposite edges.

3. The compensation device according to claim 1, wherein a center of the reference region is at a center of the first image in a second direction, the second direction being perpendicular to the first direction.

4. The compensation device according to claim 1, wherein a center of the reference region is between a center of the first image and the region to be compensated in a second direction, the second direction being perpendicular to the first direction; or the center of the reference region is on a side, distal to the region to be compensated, of the center of the first image in the second direction.

5. The compensation device according to claim 1, wherein a length of the reference region in the first direction ranges from a length of the first image in the first direction divided by 10 to the length of the first image in the first direction divided by 5.

6. The compensation device according to claim 1, wherein a length of the reference region in a second direction ranges from a length of the first image in the second direction divided by 10 to the length of the first image in the second direction divided by 5, wherein the second direction is perpendicular to the first direction.

7. A display apparatus, comprising a display panel and a control assembly, wherein the display panel comprises sub-pixels for emitting beams of a first color;

the control assembly is configured to acquire compensation data of a region to be compensated, wherein the compensation data is determined by: acquiring a first image in a case that the display apparatus displays a picture of the first color; determining a reference region in the first image based on a position of the region to be compensated in the first image in a first direction; and determining the compensation data based on average brightness of the reference region and average brightness of the region to be compensated; the reference region having a same position as the region to be compensated in the first direction and the reference region being greater than the region to be compensated;

the control assembly is configured to perform, based on the compensation data, compensation on the region to be compensated of the picture displayed in the display panel, wherein the compensation data of the region to be compensated is configured to enable the display apparatus to adjust a region corresponding to the region to be compensated, such that brightness of the region to be compensated is consistent with average brightness of the reference region, and the region to be compensated is any region in the first image, and the position of the reference region varies with the position of the region to be compensate; and the control assembly is further configured to: determine, based on the position of the region to be compensated in the first direction, a strip-shaped region in which the region to be compensated is disposed, wherein the first image comprises a plurality of strip-shaped regions distributed in the first direction, and each of the plurality of strip-shaped regions is provided with a preset reference region; and determine the preset reference region in the strip-shaped region in which the region to be compensated is disposed as the reference region.

8. A compensation method for a display apparatus, comprising:

acquiring a first image in a case that the display apparatus displays a picture of a first color, wherein the display apparatus comprises sub-pixels for emitting beams of the first color;

determining a reference region in the first image based on a position of a region to be compensated in the first image in a first direction, wherein the reference region has a same position as the region to be compensated in the first direction, the reference region being greater than the region to be compensated;

determining compensation data of the region to be compensated based on average brightness of the reference region and average brightness of the region to be compensated, wherein the compensation data of the region to be compensated is configured to enable the display apparatus to adjust a region corresponding to the region to be compensated, such that brightness of the region to be compensated is consistent with average brightness of the reference region, and the region to be compensated is any region in the first image, and the position of the reference region varies with the position of the region to be compensated;

determining, based on the position of the region to be compensated in the first direction, a strip-shaped region in which the region to be compensated is disposed, wherein the first image comprises a plurality of strip-shaped regions distributed in the first direction, and each of the plurality of strip-shaped regions is provided with a preset reference region; and determining the preset reference region in the strip-shaped region in which the region to be compensated is disposed as the reference region.

9. A compensation device for a display apparatus, comprising a processor and a memory storing at least one instruction, at least one program, a code set, or an instruction set, wherein the processor, when loading and executing the at least one instruction, the at least one program, the code set, or the instruction set, is caused to perform the compensation method for the display apparatus as defined in claim 8.

10. A non-transitory computer storage medium, storing at least one instruction, at least one program, a code set, or an instruction set, wherein the at least one instruction, the at least one program, the code set, or the instruction set, when loaded and executed by a processor, causes the processor to perform the compensation method of the display apparatus as defined in claim 8.

* * * * *